United States Patent
Motoyanagi et al.

(10) Patent No.: US 12,092,792 B2
(45) Date of Patent: Sep. 17, 2024

(54) OPTICAL MEMBER WITH REDUCED LOW-MOLECULAR-WEIGHT SILOXANE CONTENT, AND METHOD FOR PRODUCING SAME

(71) Applicant: ASAHI RUBBER INC., Saitama (JP)

(72) Inventors: Takayuki Motoyanagi, Saitama (JP); Satoshi Endo, Saitama (JP); Hiroki Hirakuri, Saitama (JP); Nobuyuki Tomizawa, Saitama (JP); Masashi Nemoto, Saitama (JP); Takeru Kawaguchi, Saitama (JP)

(73) Assignee: ASAHI RUBBER INC., Saitama (JP)

( * ) Notice: Subject to any disclaimer, the term of this patent is extended or adjusted under 35 U.S.C. 154(b) by 653 days.

(21) Appl. No.: 17/417,674

(22) PCT Filed: Dec. 27, 2019

(86) PCT No.: PCT/JP2019/051378
§ 371 (c)(1),
(2) Date: Jun. 23, 2021

(87) PCT Pub. No.: WO2020/138401
PCT Pub. Date: Jul. 2, 2020

(65) Prior Publication Data
US 2022/0113451 A1  Apr. 14, 2022

(30) Foreign Application Priority Data

Dec. 28, 2018 (JP) .................. 2018-247181

(51) Int. Cl.
| | |
|---|---|
| *G02B 1/04* | (2006.01) |
| *B29C 71/02* | (2006.01) |
| *C08J 7/02* | (2006.01) |
| *C08L 83/04* | (2006.01) |

(52) U.S. Cl.
CPC .................. *G02B 1/04* (2013.01); *C08J 7/02* (2013.01); *C08J 7/08* (2013.01); *C08L 83/04* (2013.01); *C08J 2383/04* (2013.01); *C08L 2201/10* (2013.01)

(58) Field of Classification Search
USPC .......................................... 528/10
See application file for complete search history.

(56) References Cited

U.S. PATENT DOCUMENTS

2009/0062499 A1  3/2009  Mogi

FOREIGN PATENT DOCUMENTS

| JP | 2004-009391 | 1/2004 |
|---|---|---|
| JP | 2006-124489 | 5/2006 |
| JP | 2008-250106 | 10/2008 |
| JP | 2009-059983 | 3/2009 |
| JP | 2009-185257 | 8/2009 |
| JP | 2011-219687 | 11/2011 |
| JP | 2016-069516 | 5/2016 |
| JP | 2018-056595 | 4/2018 |

OTHER PUBLICATIONS

JP2004009391 Machine Translation (Year: 2004).*
Written opinion and search report for PCT/JP2019/051378, Jul. 2, 2020, Asahi Rubber Inc.—owned by Applicant.

* cited by examiner

*Primary Examiner* — Terressa Boykin
(74) *Attorney, Agent, or Firm* — Brian S. Boyer; SYNDICATED LAW, PC

(57) ABSTRACT

The present invention provides: a highly transparent optical member which is formed from a silicone resin or a silicone rubber, and which has less mass change and excellent heat resistance without causing contact faults, or deterioration or contamination of the surface of other members due to adhesion to an electronic circuit or the surfaces of other members; and a production method for producing said optical member. According to the production method, the content of low-molecular-weight siloxanes $D_3$-$D_{20}$ in a optical member is reduced to an infinitesimal amount with use of a plurality of different low-molecular-weight siloxane removal steps.

11 Claims, 2 Drawing Sheets

[Fig. 1]
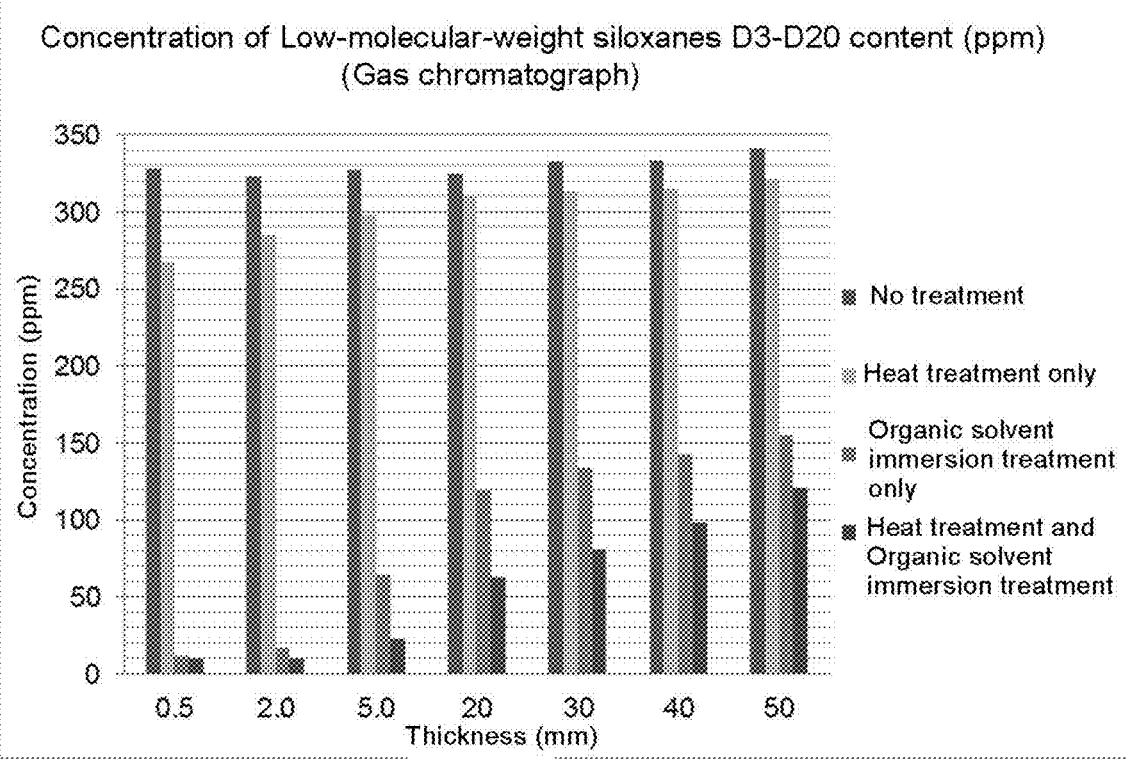
[Fig. 2]
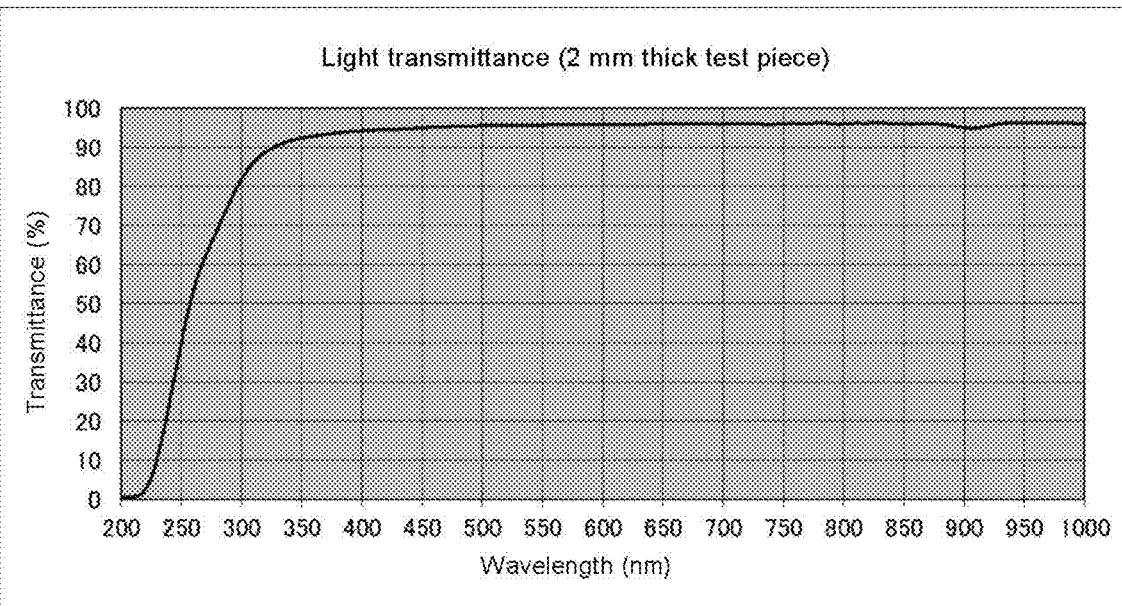

[Fig. 3a]
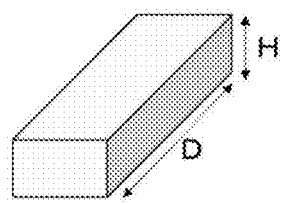
[Fig. 3b]
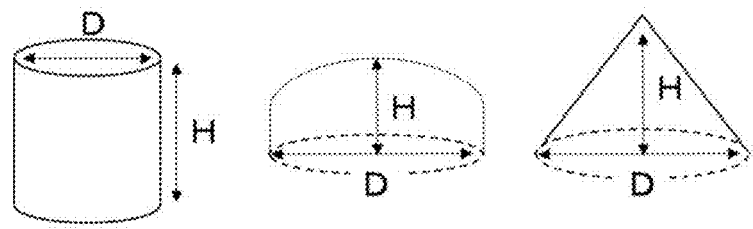
[Fig. 3c]
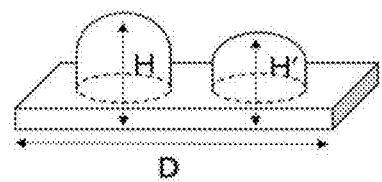

OPTICAL MEMBER WITH REDUCED LOW-MOLECULAR-WEIGHT SILOXANE CONTENT, AND METHOD FOR PRODUCING SAME

CROSS-REFERENCE TO RELATED APPLICATIONS

This application is a national stage entry from International Application No. PCT/JP2019/051378, filed Dec. 27, 2019, and claims the benefit of prior Application No. JP 2018-247181, filed Dec. 28, 2018, each of which is hereby incorporated herein by reference in its entirety.

BACKGROUND

Field of the Invention

The present invention relates to an optical member which is formed from a silicone resin or a silicone rubber with reduced low-molecular-weight siloxane content, and which is used for in-vehicle optical member such as headlight, optical member for indoor uses such as projector lights, light diffusing or condensing lenses for lighting, camera lenses, lenses for optical elements, optical members used for illumination lightings, optical light guide members and the like; and a method for producing said optical members.

Optical members are used in various optical devices such as cameras and headlights, and require unique and superior optical characteristics depending on the purposes of the devices. In addition, according to usage mode of the devices, durability characteristics such as excellent heat resistance or weather resistance; and manufacturing characteristics which the members can be uniformly molded homogenously with good yield and in large quantities into a specific shape which is lighter, smaller or larger, are required.

In order to meet these needs, transparent inorganic materials such as inorganic glasses and transparent polymer materials such as acrylic resins, polycarbonate resins, COP (cycloolefin polymer) resins, PET (polyethylene terephthalate) resins, silicone-modified epoxy resins, silicone resins and silicone rubbers are widely used as raw materials for the optical members, and among them, silicone resind and silicone rubbers have lower density than inorganic glasses and are superior in heat resistance to other resins.

However, it is a problem that a molded body molded from the silicone resin or the silicone rubber contains a large amount of low-molecular-weight siloxanes $D_3$-$D_{20}$, and low-molecular-weight siloxanes contained therein volatilize when heated, and adheres to an electronic circuit or the surfaces of other members, causing contact faults, or deterioration or contamination of the surfaces of other members, which exerts an adverse effect.

Patent Document 1 discloses a method of production for silicone resin particles and silicone rubber particles having tetramer ($D_4$) and/or pentamer ($D_5$) cyclic dimethylpolysiloxane content of 100 ppm or less, comprising a step of heating a curable liquid silicone or a liquid silicone constituting the same which is a raw material thereof, under reduced pressure using a thin film distillation apparatus to volatilize and remove cyclic dimethylpolysiloxane.

Patent Document 2 discloses a semiconductor device using materials for protecting semiconductor elements, the materials being not containing cyclic siloxane compounds from trimer ($D_3$) to decamer ($D_{10}$), or containing 500 ppm or less cyclic siloxane compound from trimer to decamer, and containing inorganic fillers having thermal conductivity of 10 W/m·K or more at 60% by weight or more and 92% by weight or less, and wherein the electric conductivity of the material for protecting the semiconductor elements is 50 mS/cm or less.

Patent Document 3 discloses a plate material for microcontact printing comprising a cured product of addition reaction curable silicone rubber composition, wherein the total content of non-functional low-molecular-weight siloxanes $D_3$-$D_{20}$ in the cured product is 200 ppm or less.

Patent Document 4 discloses a method for producing a silicone rubber molded product characterized by removing low-molecular-weight siloxane by heating and evacuating the resulting molded product under the condition of pressure of 10 Pa to 1×10-4 Pa and temperature of 10° C. to 200° C. after a silicone rubber is molded.

Patent Document 5 discloses a method for cleaning a silicone rubber product comprising an ultrasonic treatment step in which a silicone rubber product is immersed in 1-bromopropane to apply ultrasonic treatment.

However, Patent Documents 1 and 2 relate to the method for reducing low-molecular-weight siloxanes up to decamer ($D_{10}$), which provide insufficient removal effect of reducing the content of low-molecular-weight siloxanes from undecamer to icosamer ($D_{11}$-$D_{20}$) having a large molecular weight.

In Patent Document 3, in a silicone rubber plate material for microcontact printing, the low-molecular-weight content in the base polymer organopolysiloxane is reduced to 1,000 ppm or less, preferably 500 ppm or less, by heating stripping under reduced pressure in order to eliminate contamination of ink material being a non-transfer material, then the total of non-functional low-molecular-weight siloxane $D_3$-$D_{20}$ included in a molded cured product of 200 ppm or less using the base polymer heated and stripped under reduced pressure is contained in the silicone rubber plate material for microcontact printing, however, in this case, because of additional step of low-molecular-weight siloxane removal from the base polymer such as heating stripping of the base polymer under reduced pressure and the statement that the removal level in the step depends on economic efficiency, the removal equipment may have performance dependence, a large variation between products may exist, the production is not easy and stable products are difficult to obtain.

According to the method for reducing residual amount of low-molecular-weight siloxane disclosed in Patent Document 4, the residual amount of low-molecular-weight siloxanes $D_4$-$D_{20}$ can be efficiently reduced to 20 ppm or less when thickness of a silicone rubber molded product is 0.5 mm, however, when the thickness of the molded product is 1.5 mm, the residual amount of low-molecular-weight siloxanes $D_4$-$D_{20}$ is about 300 ppm, which means inefficient reduction, therefore the thicker the molded product, lesser the reduction efficiency.

According to the reduction method of Patent Document 5, the total value of residual amount of cyclic dimethylpolysiloxanes $D_4$-$D_{20}$ can be reduced to 10 ppm when the average thickness of a silicone rubber product is 1.0 mm, but in the case the thickness of the molded product is 3.0 mm, the total value of residual amount of low-molecular-weight siloxanes $D_4$-$D_{20}$ is 870 ppm, that is, reduction efficiency became poorer.

Prior Art Documents

[Patent Document 1] Japanese Unexamined Patent Application Publication No. 2016-69516
[Patent Document 2] Japanese Unexamined Patent Application Publication No. 2018-56595
[Patent Document 3] Japanese Unexamined Patent Application Publication No. 2009-59983
[Patent Document 4] Japanese Unexamined Patent Application Publication No. 2004-9391
[Patent Document 5] Japanese Unexamined Patent Application Publication No. 2006-124489

SUMMARY OF THE INVENTION

Problems to be Solved by the Invention

In recent years, it has been regarded as a problem, especially in optical members, that adhesion of low-molecular-weight siloxane to an electronic circuit or the surfaces of other members causes contact faults, or deterioration or contamination of the surfaces of other members, and it is required to reduce the content level of low-molecular-weight siloxanes $D_3$-$D_{20}$ in a molded body formed from silicone resin or silicone rubber from the level of conventional low-molecular-weight siloxanes, but it has yet to be possible to obtain optical members formed from a silicone resin or a silicone rubber which satisfies the market demand and required precise optical design.

It is an object of the present invention to provide an optical member formed from silicone resins or silicone rubbers, the content of low-molecular-weight siloxanes $D_3$-$D_{20}$ contained in the optical member formed from the silicone resin or the silicone rubber is reduced to be an infinitesimal amount, the optical member preventing contact faults, or deterioration or contamination on the surfaces of other members caused by adhesion of siloxanes onto electronic circuits or the surfaces of other members incorporated together with the optical member formed of the silicone resin or the silicone rubber, and the optical member is excellent in shape stability and heat resistance, and highly transparent because of less mass change due to volatilization of low-molecular-weight siloxane content.

Means for Solving the Problems

The present invention has following aspects:
[1] An optical member which is formed from a silicone resin or a silicone rubber and transmits or guides light, wherein the member has a total value of content of low-molecular-weight siloxanes $D_3$-$D_{20}$ of 100 ppm or less.
[2] The optical member according to [1], wherein the total value of content of the low-molecular-weight siloxanes $D_3$-$D_{20}$ of the optical member is 65 ppm or less.
[3] The optical member according to [1], wherein the total value of content of the low-molecular-weight siloxanes $D_3$-$D_{20}$ of the optical member is 50 ppm or less.
[4] The optical member according to [1], wherein the total value of content of the low-molecular-weight siloxanes $D_3$-$D_{20}$ of the optical member is 25 ppm or less.
[5] The optical member according to any one of [1] to [4], wherein the optical member has transmittance of 80% or more in entire range of visible light wavelength region and near infrared wavelength region of 380 nm to 1,000 nm.
[6] The optical member according to any one of [1] to [5], wherein a representative thickness of the optical member is 30 mm or less.
[7] The optical member according to any one of [1] to [6], wherein the optical member is an in-vehicle optical member.
[8] The optical member according to any one of [1] to [7], wherein the optical member has a shape having an alignment part with another member.
[9] The optical member according to any one of [1] to [8], wherein the optical member does not contain a natural silica or a synthetic silica.
[10] An optical member in which the optical member according to any one of [1] to [9] is integrally molded or adhesively bonded after molding into one body with a material other than a silicone or another molded product.
[11] A production method of the optical member according to any one of [1] to [9] comprising a low-molecular-weight siloxane removing step (A) and a low-molecular-weight siloxane removing step (B) being different from the low-molecular-weight siloxane removing step (A).
[12] The production method according to [11], wherein the low-molecular-weight siloxane removing step (A) is a step of reducing mainly low-molecular-weight siloxane $D_3$-$D_{10}$ and the low-molecular-weight siloxane removing step (B) is a step of reducing mainly low-molecular-weight siloxane $D_{11}$-$D_{20}$.
[13] The production method according to [11] or [12], wherein the low-molecular-weight siloxane removing step (A) is a heat treatment of the optical member, and the low-molecular-weight siloxane removing step (B) is immersing the optical member in an organic solvent to remove the low-molecular-weight siloxane.

In the present specification, numerical value of low-molecular-weight siloxane content of an object is expressed by ppm, wherein said value is obtained by dividing the measured content amount by the target substance amount, said measured content amount is measured by immersing the object in an immersion liquid for chromatography for a certain period of time and subjecting the immersion liquid to gas chromatography to measure the content in the immersion liquid. Therefore, the meaning of the content cannot be determined unless the immersion liquid is specified. In the present specification, unless otherwise specified, the value is the result of hexane immersion.

Advantageous Effects of the Invention

As the total value of content of low-molecular-weight siloxanes $D_3$-$D_{20}$ in the optical member according to the present invention is 100 ppm or less, it becomes possible to provide optical members having reduced risk of contact faults, or deterioration or contamination of the surfaces of other members due to adhesion to an electronic circuit incorporated with the optical member or the surfaces of other members, and to provide the optical member having less mass change of the optical member due to heating of molded product; having durability characteristics such as excellent heat resistance or weather resistance of silicone; having manufacturing characteristics which the members can be uniformly molded into a specific shape which is lighter, smaller or larger, homogenously, with good yield and in large quantities; and capable of utilizing characteristics of low density, lower than inorganic glasses.

Further, it becomes possible that light from a light source can be transmitted or guided without loss by having high transparency and it is possible to have functionality such as diffusion and collection of light depending on the shape of the optical member.

Further, it becomes possible that even on an optical member formed from a silicone resin or a silicone rubber having a certain product thickness, reduced low-molecular-weight siloxane content makes it possible to reduce, as compared with conventional cases, risk of contact faults, or deterioration or contamination on the surfaces of other members due to adhesion to the electronic circuit or the surfaces of other members.

In addition, as the silicone has lower density than the inorganic glass, improvement of fuel efficiency of the vehicle can be expected by less weight of the optical member compared to the inorganic glass optical member when it is mounted on a vehicle as an alternative to an inorganic glass optical member, and it further becomes possible by using the silicone resins or the silicone rubbers as base material to mold an optical member with complicated shapes which is difficult for the inorganic glass.

Further, by making a shape having an alignment part to another member makes the mounting on the other member easier.

Furthermore, the optical member makes it possible to have more complicated shape and various characteristics by integrally molding or adhesively bonding after molding the silicone resin or the silicone rubber as base material with materials other than silicone or with another molded product.

By the present invention as manufacturing method of the present optical member, it becomes possible to reduce low-molecular-weight siloxane in the molded optical member with high accuracy and efficiency by providing two or more types of low-molecular-weight siloxane removing steps by including low-molecular-weight siloxane removing step (A) in molded optical member and low-molecular-weight siloxane removing step (B) which is different from the low-molecular-weight siloxane removing step (A) in the method for manufacturing the optical member, and it is possible to reduce stress on single low-molecular-weight siloxane removing step and to reduce the low-molecular-weight siloxane content which is difficult to reduce with one type of step by combining different low-molecular-weight siloxane removing steps.

In the present manufacturing method for the optical member, the low-molecular-weight siloxane removing step (A) in the molded optical member can simply remove low-molecular-weight siloxane (mainly $D_3$-$D_{10}$) by heat treatment, and the low-molecular-weight siloxane removing step (B), which is different from the low-molecular-weight siloxane removing step (A), reduces low-molecular-weight siloxane (mainly $D_{11}$-$D_{20}$), being difficult for only heat treatment to reduce, by immersing the optical member in an organic solvent to extract and remove said low-molecular-weight siloxane (mainly $D_{11}$-$D_{20}$) in the optical member. In this case, by reducing the low-molecular-weight siloxane contained in the optical member with heat treatment at first, total amount of low-molecular-weight siloxane which is extracted by the organic solvent, removed and reduced in the optical member during next step may be reduced, and extract amount of low-molecular-weight siloxane per immersion step is reduced compared to the case of removing low-molecular-weight siloxane only by immersion step in the organic solvent without heat treatment of earlier step, which leads to a reduction in the frequency of replacement of the organic solvent used in the step and makes it possible to reduce environmental load by reducing disposal amount of the organic solvent.

BRIEF DESCRIPTION OF THE DRAWINGS

FIG. 1 is a graphic diagram of an experimental results shown in Table 1 according to the invention of the present application.

FIG. 2 is a graph showing transmittance according to the invention of the present application.

FIG. 3a is a drawing illustrating a representative thickness of an optical member according to the invention of the present application.

FIG. 3b is a drawing illustrating a representative thickness of an optical member according to the invention of the present application.

FIG. 3c is a drawing illustrating a representative thickness of an optical member according to the invention of the present application.

DESCRIPTION OF THE EMBODIMENTS

The optical member of the present invention is possible to reduce risk of contact faults, or of deterioration or contamination of the surfaces of other members due to adhesion to an electronic circuit incorporated with the optical member or to the surfaces of other members, and to reduce risk of mass change caused by volatilization of contained low-molecular-weight siloxane due to heating on the optical member, because the total value of content of low-molecular-weight siloxanes $D_3$-$D_{20}$ in the optical member formed from a silicone resin or a silicone rubber and transmits or guides light is 100 ppm or less, compared to cases where a total value of content of low-molecular-weight siloxanes $D_3$-$D_{20}$ is, for example, as large as 1,000 ppm. In the case of, preferably, the total value of content of low-molecular-weight siloxanes $D_3$-$D_{20}$ is 65 ppm or less, more preferably, the total value of content of low-molecular-weight siloxanes $D_3$-$D_{20}$ is 50 ppm or less, and even more preferably, the total value of content of low-molecular-weight siloxanes $D_3$-$D_{20}$ is 25 ppm or less, it is favorable as it leads to better result of reducing risk of contact faults, or deterioration or contamination of the surfaces of other members due to adhesion to the electronic circuit or the surfaces of other members, and reducing mass change caused by volatilization of low-molecular-weight siloxane in the optical member due to heating.

On the other hand, in the case of the total value of content of low-molecular-weight siloxanes $D_3$-$D_{20}$ of an optical member is large, for example 1,000 ppm, contained low-molecular-weight siloxane volatilizes and reduces the mass of the optical member and changes the product dimensions when the optical member which is formed from a silicone resin or a silicone rubber is heated by heat generated by lighting of an LED light source and the like located extremely close or temperature environment of the outside air, resulting in the loss of desired optical characteristics. Therefore, it is favorable to set the total value of content of low-molecular-weight siloxane $D_3$-$D_{20}$ to 100 ppm or less, preferably the total value of content of low-molecular-weight siloxane $D_3$-$D_{20}$ to 65 ppm or less, more preferably, the total value of content of low-molecular-weight siloxane $D_3$-$D_{20}$ to 50 ppm or less, and further more preferably, the total value of content of low-molecular-weight siloxane $D_3$-$D_{20}$ to 25 ppm or less, in which product dimension change due to volatility of low-molecular-weight siloxane is smaller. Thus, for example, even if the optical member is located extremely close to high-power LED light source, it is possible to maintain desired optical characteristics because product dimension change due to reduction of mass of the optical member caused by heating of the optical member by heat generated by lighting and volatility of low-molecular-weight siloxane can be prevented. If change in product dimensions due to mass reduction of the optical member is +/−2% or less, preferably +/−1% or less, it is possible to maintain desired optical characteristics of the optical member.

The optical member of the present invention does not have restriction in shape, and the shape can be adjusted according to desired function or characteristics of the optical member such as collection, diffusion and guide of light from a light source.

Further, it is preferable that the optical member of the present invention has a shape with alignment parts as it makes it easy to mount on other members. The light source in this case includes LED light source, LD light source, electroluminescence, xenon lamp, halogen lamp, sunlight and the like.

As for representative thickness of the optical member of the present invention, since low-molecular-weight siloxane removing step requires a long time, it is preferable that the representative thickness of the optical member of the present invention is 30 mm or less, preferably 20 mm or less, more preferably 10 mm or less, and further more preferably 5 mm or less in order to obtain product with industrial efficiency, in which the total value of content of low-molecular-weight siloxane can be 100 ppm or less with no requirement of long-time low-molecular-weight siloxane removing step.

The representative thickness refers to a thickness which represents the optical member, which is, for example, as shown in FIG. 3a to FIG. 3c, the longest side of the optical member, or if a circle is included such as a cylinder or a cone, D is the representative thickness if H>D, and H is the representative thickness if H<D, where the diameter is set to D and the height of the optical member such as cylinder or cone is set to H. Since it is easier to remove low-molecular-weight siloxane in a thin part than in a thick part, above values are used as an index to predict removal effect without depending on the shape considering that removal effect differs depending on the shape even if volume is the same. Taking up a rectangular parallelepiped of FIG. 3a as an example, the representative thickness of the rectangular parallelepiped is H where the longest side is set to D and the shortest side is set to height H. Also, using an example of a cylindrical shape of FIG. 3b, where its diameter is set to D when the circle is a perfect circle, otherwise, the diameter on the minor axis side is set to D and the height is set to H, if D is smaller, the representative thickness is D. And, if H is smaller than D, H is the representative thickness. Similarly in the case of a cone, if D is smaller than H, D is the representative thickness.

Further, in the case of a shape having a plurality of lenses on a rectangular parallelepiped as in FIG. 3c, where the longest side is set to D and heights of optical member are set to H and H', if D>H>H' is true then the representative thickness of the complicated shape is H. Even in shapes other than the shape examples shown in FIG. 3a to FIG. 3c, it is possible, from the viewpoint of penetration distance of the organic solvent, to predict the effect of removing low-molecular-weight siloxane and set the processing content properly by setting the representative thickness the smallest thickness when the entire object is considered to be a rough three-dimensional shape.

Hardness of the optical member of the present invention is not particularly restricted, and the silicone resin or the silicone rubber as base material can be selected according to the shape, use, and characteristics which are desired for the product. Shore D hardness measured by the method of JIS K 7215 (Testing Methods for Durometer Hardness of Plastics) or Shore A hardness measured by the method of JIS K 6253 (Rubber, vulcanized or thermoplastic—Determination of hardness) may be utilized, for example, Shore A hardness of 10 to 20 may be favorable if a flexible optical member is considered and its self-standing shape is taken into account. Shore A hardness of 20 to 70 may be favorable if an optical member having a certain degree of elasticity and a functionality of restoring force against an external force. The hardness can be adjusted in the range of Shore A hardness 70 to Shore D hardness 50 in order to prevent surface of the optical member from being damaged while maintaining elasticity. Preferably shore A hardness 75 to shore D hardness 30, more preferably shore A hardness 80 to shore D hardness 30 is favorable.

When the optical member of the present invention has a thickness of 2 mm, it is preferable to have 80% or more of transmittance in the entire range of visible light wavelength region and near infrared wavelength region of 380 nm to 1,000 nm even if required optical characteristic is low level and cost is to be prioritized such as light diffusion cover and light transmission cover, and 85% or more is preferable if both of cost and optical characteristic are to be achieved such as light guide member with short optical path length, and 90% or more is preferable if higher level of optical characteristic is required.

Inclusion or exclusion of a natural silica or a synthetic silica in the optical member of the present invention is selectable depending on required characteristics, and it is preferable not to add the natural silica or the synthetic silica if high transparency and transmission are required in the molded product. It is preferable to add the natural silica or the synthetic silica in case improved heat resistance or imparting light diffusivity from a light source is required, and amount thereof is adjustable according to desired functionality so that transmittance in the entire range of visible light wavelength region and near infrared wavelength region of 380 nm to 1,000 nm is 80% or more. For example, 0.01% to 0.5% by mass is preferable.

Further, it is not restricted to add additives such as antistatic agent, retarder, ultraviolet absorber and pigment in the optical member of the present invention as long as effects of the present invention are not impaired, and blending amount thereof can be adjusted according to desired functionality.

Materials of the optical member of the present invention is not particularly restricted as long as base material is silicone resin or silicone rubber, the base material can be a solid silicone resin or silicone rubber before curing, a semi-solid silicone resin or silicone rubber before curing, and a liquid silicone resin or silicone rubber before curing, and it is possible to select curing method of silicone to meet desired function of the optical member and the shape of the optical member, selectable from thermosetting silicone resin or silicone rubber, photosetting silicone resin or silicone rubber, and photosetting-thermosetting silicone resin or silicone rubber and the like or combination thereof. Among them, the liquid silicone resin or silicone rubber before curing is preferably used, and it is possible to mold even a complicated shape of the optical member.

Further, the liquid addition reaction curable silicone resin or silicone rubber before curing is more preferable as it can be molded into a complicated optical member shape and has less impurities generated during reaction than condensation curing silicone resin or silicone rubber, and an optical member with high transparency can be formed from it.

It is not particularly restricted as long as it is an addition reaction curable silicone resin or silicone rubber. Above all, thermosetting addition reaction curable silicone resin or silicone rubber is preferable as the optical member can be easily formed from. For example, a composition using an organopolysiloxane as base polymer and containing an organohydrogenpolysiloxane and a heavy metal catalyst such as platinum-based catalyst can be used.

Type and amount of the organohydrogenpolysiloxane and the catalyst may be appropriately determined taking the degree of cross-linking and curing rate into consideration, and a dimethylpolysiloxane or a dimethylsiloxane may be selected for base polymer if heat resistance functionality is required, and a methylphenylsiloxane copolymer may be selected for base polymer if higher refractive index functionality is required.

Molding method of the optical member of the present invention is not particularly restricted, and known molding methods can be used. For example, compression molding, injection molding, transfer molding, extrusion molding, calendar molding, coating molding, insert molding, molding by a 3D printer, and the like can be used.

The compression molding or the injection molding is preferable for a three-dimensional optical member based on optical design. Among them, the injection molding is preferable as it has less loss of base material and an optical member with complicated shape can be formed in fast molding cycle by using addition reaction of curable silicone resin or silicone rubber as base material being a liquid before curing.

Further, the optical member of the present invention may be a member in which the silicone resin or the silicone rubber as base material and a material other than silicone or other molded product are integrally molded or adhesively bonded after molding.

Light may be extracted efficiently and it is possible to selectively mold the optical member according to product design, for example, by combining with a member having light-shielding property or reflective property or composition thereof and another resin and the like by blending additive or the like to material or metal having light-shielding property or reflective property, and the silicone resin or the silicone rubber as base material, at a part other than where the light from a light source is necessary to transmit or to be guided. In such a case, integral molding is easily possible by performing insert molding. Here, materials other than the silicone include resin materials such as an epoxy resin and an acrylic resin, thermoplastics such as an engineering plastic and a super engineering plastic, thermosetting resins, optically excellent resins such as a cycloolefin polymer resin (COP) and a polyether sulfone resin (PES), metals such as aluminum, titanium, stainless steel, gold, silver and copper, glass and ceramics and the like can be used.

Further, in the above, the other molded product refers to a molded product which is molded in another step such as an optical member having a different shape.

Production method of the optical member according to the present invention is a production method comprising a low-molecular-weight siloxane removing step (A) and a low-molecular-weight siloxane removing step (B) which is different from the low-molecular-weight siloxane removing step (A), in which it is possible to obtain an optical member having the total value of content of low-molecular-weight siloxanes $D_3$-$D_{20}$ of 100 ppm or less by performing two or more types of low-molecular-weight siloxane removing steps on the low-molecular-weight siloxane and the low-molecular-weight siloxane removing steps may be performed by selecting and combining steps such as heat treatment of the molded optical member, heat treatment and immersion in an organic solvent in a vacuum or reduced pressure environment, cleaning with steam of an organic solvent and extraction of a critical fluid. Among them, it is preferable that the low-molecular-weight siloxane removing step (A) is heat treatment and the low-molecular-weight siloxane removing step (B) is immersion in an organic solvent, because the optical member of the present invention can be produced with high production efficiency in this way. In this case, low-molecular-weight siloxane can be removed more efficiently by performing a low-molecular-weight siloxane removing step by immersing in an organic solvent or the like after performing the heat treatment under reduced pressure environment or vacuum environment.

Further, during the step of removing the low-molecular-weight siloxane by immersing in the organic solvent, it is preferable to perform ultrasonic treatment or stirring and the like as well, so that low-molecular-weight siloxane can be removed more efficiently in a shorter treatment time.

The organic solvent used in the step of removing low-molecular-weight siloxane by immersing the molded optical member in the organic solvent is preferably an organic solvent having a solubility parameter (SP value) close to that of the silicone which is the base material of the optical member, and organic solvents having a solubility parameter (SP value) of 6 to 9 are particularly preferable. For example, n-butane, n-pentane, n-hexane, 1-bromopropane, 1-bromobutane and the like may be mentioned.

The total value of content thereof can be 50 ppm or less, or even 25 ppm or less by adjusting treatment time and temperature.

Further, the production method of the optical member according to the present invention may include a drying step of drying the organic solvent in the optical member as a post-step of the low-molecular-weight siloxane removing step of immersing in the organic solvent, and the drying temperature is not particularly restricted.

The optical member according to the present invention effectively prevents generation of volatile component which causes contact faults, or deterioration or contamination of the surfaces of other members by adhesion to the electronic circuit and the surfaces of other members, even used in high temperature places, because the content of low-molecular-weight siloxanes but relatively large molecule in conventional low-molecular-weight siloxanes of up to $D_{20}$ is such an unbelievably low content.

Further, the optical member according to the present invention has an exceptionally advantageous effect that volatile component is significantly low as a member requiring thickness, since the content of low-molecular-weight siloxane is remarkably low even if it is much thicker than a conventional member.

The thicker the member is, the more difficult it is to reduce low-molecular-weight siloxane content conventionally, however, as can be seen from embodiments described below, the optical member according to the present invention is characterized in that, even if thickness value is the same, the content of low-molecular-weight siloxane is significantly reduced to the level unbelievable in conventional members.

Further, according to the method of the present invention, it is possible to perform processes of reducing the content much more than conventional method in shorter time and in greater volume.

EMBODIMENTS

In the embodiments, heating temperature is preferably 130° C. or higher, and solvent extraction time for gas chromatography measurement is preferably selected in the range of 1 hour or more and 20 hours or less according to material properties.

In addition, in order to evaluate the stability of the shape of the optical member against heating, shape change rate was judged to be "success" if shape change rate is +/−1% and otherwise to be "fail" by a test at 120° C. for 500 hours.

Embodiment 1

A silicone optical member with 70 mm square and representative thickness of 0.5 mm was molded, and the optical member was heat-treated in a heating oven for 3 to 6 hours, and then the optical member was immersed in 2 liters of 1-bromopropane in a beaker stirring for 6 to 12 hours. Then, the optical member was removed from 1-bromopropane, and the optical member was dried. In order to measure the contained low-molecular-weight siloxanes $D_3$-$D_{20}$, the dried optical member was cut into 1 to 2 mm square, 0.5 g thereof was sampled and was immersed in 5 ml of special grade chromatographic hexane for 16 hours, then low-molecular-weight siloxanes $D_3$-$D_{20}$ contained in the optical member was eluted.

Eluted content was quantified by gas chromatography, and the content of low-molecular-weight siloxanes $D_3$-$D_{20}$ contained in the optical member was calculated.

Embodiment 2

Processes and gas chromatography were performed in the same manner as in Embodiment 1 except that a silicone optical member with 70 mm square and representative thickness of 2.0 mm was molded, low-molecular-weight siloxane contained in the optical member was quantified, and the content of low-molecular-weight siloxanes $D_3$-$D_{20}$ contained in the optical member was calculated.

Embodiment 3

Processes and gas chromatography were performed in the same manner as in Embodiment 1 except that a silicone optical member with 70 mm square and representative thickness of 5.0 mm was molded, low-molecular-weight siloxane contained in the optical member was quantified, and the content of low-molecular-weight siloxanes $D_3$-$D_{20}$ contained in the optical member was calculated.

Embodiment 4

Processes and gas chromatography were performed in the same manner as in Embodiment 1 except that a silicone optical member with 70 mm square and representative thickness of 10 mm was molded, low-molecular-weight siloxane contained in the optical member was quantified, and the content of low-molecular-weight siloxanes $D_3$-$D_{20}$ contained in the optical member was calculated.

Embodiment 5

Processes and gas chromatography were performed in the same manner as in Embodiment 1 except that a silicone optical member with 70 mm square and representative thickness of 20 mm was molded, low-molecular-weight siloxane contained in the optical member was quantified, and the content of low-molecular-weight siloxanes $D_3$-$D_{20}$ contained in the optical member was calculated.

Embodiment 6

Processes and gas chromatography were performed in the same manner as in Embodiment 1 except that a silicone optical member with 70 mm square and representative thickness of 30 mm was molded, low-molecular-weight siloxane contained in the optical member was quantified, and the content of low-molecular-weight siloxanes $D_3$-$D_{20}$ contained in the optical member was calculated.

Comparative Example 1

Processes and gas chromatography were performed in the same manner as in Embodiment 1 except that a silicone optical member with 70 mm square and representative thickness of 40 mm was molded, low-molecular-weight siloxane contained in the optical member was quantified, and the content of low-molecular-weight siloxanes $D_3$-$D_{20}$ contained in the optical member was calculated.

Comparative Example 2

Processes and gas chromatography were performed in the same manner as in Embodiment 1 except that a silicone optical member with 70 mm square and representative thickness of 50 mm was molded, low-molecular-weight siloxane contained in the optical member was quantified, and the content of low-molecular-weight siloxanes $D_3$-$D_{20}$ contained in the optical member was calculated.

Comparative Example 3

A silicone optical member with 70 mm square and representative thickness of 0.5 mm was molded, the process for removing low-molecular-weight siloxane as in Embodiment 1 was not performed, dried optical member was cut into 1 to 2 mm square to measure low-molecular-weight siloxane $D_3$-$D_{20}$ contained in the optical member, 0.5 g thereof was sampled and was immersed in 5 ml of special grade chromatographic hexane for 16 hours, then low-molecular-weight siloxanes $D_3$-$D_{20}$ contained in the optical member was eluted. This was quantified by gas chromatography, and the content of low-molecular-weight siloxanes $D_3$-$D_{20}$ contained in the optical member was calculated.

Comparative Example 4

The process was performed in the same manner, except that a silicone optical member with 70 mm square and representative thickness of 2.0 mm was molded, as in Comparative example 3, i.e. removing low-molecular-weight siloxane was not performed, and gas chromatography was performed to quantify low-molecular-weight siloxane contained in the optical member, and the content of low-molecular-weight siloxanes $D_3$-$D_{20}$ contained in the optical member was calculated.

Comparative Example 5

The process for removing low-molecular-weight siloxane was not performed as the same manner as in Comparative example 3 except that a silicone optical member with 70 mm square and representative thickness of 5.0 mm was molded, gas chromatography was performed to quantify low-molecular-weight siloxane contained in the optical member, and the content of low-molecular-weight siloxanes $D_3$-$D_{20}$ contained in the optical member was calculated.

Comparative Example 6

The process for removing low-molecular-weight siloxane was not performed as in the same manner as in Comparative example 3 except that a silicone optical member with 70 mm square and representative thickness of 10 mm was molded, gas chromatography was performed to quantify low-molecular-weight siloxane contained in the optical member, and the content of low-molecular-weight siloxanes $D_3$-$D_{20}$ contained in the optical member was calculated.

Comparative Example 7

The process for removing low-molecular-weight siloxane was not performed as in the same manner as in Comparative example 3 except that a silicone optical member with 70 mm square and representative thickness of 20 mm was molded, gas chromatography was performed to quantify low-molecular-weight siloxane contained in the optical member, and the content of low-molecular-weight siloxanes $D_3$-$D_{20}$ contained in the optical member was calculated.

Comparative Example 8

The process for removing low-molecular-weight siloxane was not performed as in the same manner as in Comparative example 3 except that a silicone optical member with 70 mm square and representative thickness of 30 mm was molded, gas chromatography was performed to quantify low-molecular-weight siloxane contained in the optical member, and the content of low-molecular-weight siloxanes $D_3$-$D_{20}$ contained in the optical member was calculated.

Comparative Example 9

The process for removing low-molecular-weight siloxane was not performed as in the same manner as in Comparative example 3 except that a silicone optical member with 70 mm square and representative thickness of 40 mm was molded, gas chromatography was performed to quantify low-molecular-weight siloxane contained in the optical member, and the content of low-molecular-weight siloxanes $D_3$-$D_{20}$ contained in the optical member was calculated.

Comparative Example 10

The process for removing low-molecular-weight siloxane was not performed as in the same manner as in Comparative example 3 except that a silicone optical member with 70 mm square and representative thickness of 50 mm was molded, gas chromatography was performed to quantify low-molecular-weight siloxane contained in the optical member, and the content of low-molecular-weight siloxanes $D_3$-$D_{20}$ contained in the optical member was calculated.

Comparative Example 11

A silicone optical member with 70 mm square and representative thickness of 0.5 mm was molded, only a heat treatment for 3 to 6 hours to remove low-molecular-weight siloxane was performed, dried optical member was cut into 1 to 2 mm square to measure low-molecular-weight siloxane $D_3$-$D_{20}$ contained in the optical member, 0.5 g thereof was sampled and was immersed in 5 ml of special grade chromatographic hexane for 16 hours, then low-molecular-weight siloxanes $D_3$-$D_{20}$ contained in the optical member was eluted. This was quantified by gas chromatography, and the content of low-molecular-weight siloxanes $D_3$-$D_{20}$ contained in the optical member was calculated.

Comparative Example 12

Only a heat treatment for 3 to 6 hours to remove low-molecular-weight siloxane was performed as in the same manner as in Comparative example 11 except that a silicone optical member with 70 mm square and representative thickness of 2.0 mm was molded, gas chromatography was performed to quantify low-molecular-weight siloxane contained in the optical member, and the content of low-molecular-weight siloxanes $D_3$-$D_{20}$ contained in the optical member was calculated.

Comparative Example 13

Only a heat treatment for 3 to 6 hours to remove low-molecular-weight siloxane was performed as in the same manner as in Comparative example 11 except that a silicone optical member with 70 mm square and representative thickness of 5.0 mm was molded, gas chromatography was performed to quantify low-molecular-weight siloxane contained in the optical member, and the content of low-molecular-weight siloxanes $D_3$-$D_{20}$ contained in the optical member was calculated.

Comparative Example 14

Only a heat treatment for 3 to 6 hours to remove low-molecular-weight siloxane was performed as in the same manner as in Comparative example 11 except that a silicone optical member with 70 mm square and representative thickness of 10 mm was molded, gas chromatography was performed to quantify low-molecular-weight siloxane contained in the optical member, and the content of low-molecular-weight siloxanes $D_3$-$D_{20}$ contained in the optical member was calculated.

Comparative Example 15

Only a heat treatment for 3 to 6 hours to remove low-molecular-weight siloxane was performed as in the same manner as in Comparative example 11 except that a silicone optical member with 70 mm square and representative thickness of 20 mm was molded, gas chromatography was performed to quantify low-molecular-weight siloxane contained in the optical member, and the content of low-molecular-weight siloxanes $D_3$-$D_{20}$ contained in the optical member was calculated.

Comparative Example 16

Only a heat treatment for 3 to 6 hours to remove low-molecular-weight siloxane was performed as in the same manner as in Comparative example 11 except that a silicone optical member with 70 mm square and representative thickness of 30 mm was molded, gas chromatography was performed to quantify low-molecular-weight siloxane contained in the optical member, and the content of low-molecular-weight siloxanes $D_3$-$D_{20}$ contained in the optical member was calculated.

Comparative Example 17

Only a heat treatment for 3 to 6 hours to remove low-molecular-weight siloxane was performed as in the same manner as in Comparative example 11 except that a silicone optical member with 70 mm square and representative thickness of 40 mm was molded, gas chromatography was performed to quantify low-molecular-weight siloxane contained in the optical member, and the content of low-molecular-weight siloxanes $D_3$-$D_{20}$ contained in the optical member was calculated.

Comparative Example 18

Only a heat treatment for 3 to 6 hours to remove low-molecular-weight siloxane was performed as in the same manner as in Comparative example 11 except that a silicone optical member with 70 mm square and representative thickness of 50 mm was molded, gas chromatography was performed to quantify low-molecular-weight siloxane contained in the optical member, and the content of low-molecular-weight siloxanes $D_3$-$D_{20}$ contained in the optical member was calculated.

Comparative Example 19

A silicone optical member with 70 mm square and representative thickness of 0.5 mm was molded, and the optical member was immersed in 2 liters of 1-bromopropane in a beaker stirring for 20 to 30 hours. Then, the optical member was removed from 1-bromopropane, and the optical member was dried. In order to measure contained low-molecular-weight siloxanes $D_3$-$D_{20}$, the dried optical member was cut into 1 to 2 mm square, 0.5 g thereof was sampled and was immersed in 5 ml of special grade chromatographic hexane for 16 hours, then low-molecular-weight siloxanes $D_3$-$D_{20}$ contained in the optical member was eluted. This was quantified by gas chromatography, and the content of low-molecular-weight siloxanes $D_3$-$D_{20}$ contained in the optical member was calculated.

Comparative Example 20

Only an immersion treatment in organic solvent for 20 to 30 hours to remove low-molecular-weight siloxane was performed as in the same manner as in Comparative example 19 except that a silicone optical member with 70 mm square and representative thickness of 2.0 mm was molded, gas chromatography was performed to quantify low-molecular-weight siloxane contained in the optical member, and the content of low-molecular-weight siloxanes $D_3$-$D_{20}$ contained in the optical member was calculated.

Comparative Example 21

Only an immersion treatment in organic solvent for 20 to 30 hours to remove low-molecular-weight siloxane was performed as in the same manner as in Comparative example 19 except that a silicone optical member with 70 mm square and representative thickness of 5.0 mm was molded, gas chromatography was performed to quantify low-molecular-weight siloxane contained in the optical member, and the content of low-molecular-weight siloxanes $D_3$-$D_{20}$ contained in the optical member was calculated.

Comparative Example 22

Only an immersion treatment in organic solvent for 20 to 30 hours to remove low-molecular-weight siloxane was performed as in the same manner as in Comparative example 19 except that a silicone optical member with 70 mm square and representative thickness of 10 mm was molded, gas chromatography was performed to quantify low-molecular-weight siloxane contained in the optical member, and the content of low-molecular-weight siloxanes $D_3$-$D_{20}$ contained in the optical member was calculated.

Comparative Example 23

Only an immersion treatment in organic solvent for 20 to 30 hours to remove low-molecular-weight siloxane was performed as in the same manner as in Comparative example 19 except that a silicone optical member with 70 mm square and representative thickness of 20 mm was molded, gas chromatography was performed to quantify low-molecular-weight siloxane contained in the optical member, and the content of low-molecular-weight siloxanes $D_3$-$D_{20}$ contained in the optical member was calculated.

Comparative Example 24

Only an immersion treatment in organic solvent for 20 to 30 hours to remove low-molecular-weight siloxane was performed as in the same manner as in Comparative example 19 except that a silicone optical member with 70 mm square and representative thickness of 30 mm was molded, gas chromatography was performed to quantify low-molecular-weight siloxane contained in the optical member, and the content of low-molecular-weight siloxanes $D_3$-$D_{20}$ contained in the optical member was calculated.

Comparative Example 25

Only an immersion treatment in organic solvent for 20 to 30 hours to remove low-molecular-weight siloxane was performed as in the same manner as in Comparative example 19 except that a silicone optical member with 70 mm square and representative thickness of 40 mm was molded, gas chromatography was performed to quantify low-molecular-weight siloxane contained in the optical member, and the content of low-molecular-weight siloxanes $D_3$-$D_{20}$ contained in the optical member was calculated.

Comparative Example 26

Only an immersion treatment in organic solvent for 20 to 30 hours to remove low-molecular-weight siloxane was performed as in the same manner as in Comparative example 19 except that a silicone optical member with 70 mm square and representative thickness of 50 mm was molded, gas chromatography was performed to quantify low-molecular-weight siloxane contained in the optical member, and the content of low-molecular-weight siloxanes $D_3$-$D_{20}$ contained in the optical member was calculated.

Table 1 below shows results of above embodiments and comparative examples.

| | Thickness (mm) | Low-molecular-weight siloxane removing step | Low-molecular-weight siloxanes D3-D20 content (ppm) | Determination of shape change rate |
|---|---|---|---|---|
| Embodiment 1 | 0.5 | Heat treatment and Organic solvent immersion treatment | 10 | ○ |
| Embodiment 2 | 2.0 | | 10 | ○ |
| Embodiment 3 | 5.0 | | 23 | ○ |
| Embodiment 4 | 10 | | 46 | ○ |
| Embodiment 5 | 20 | | 63 | ○ |
| Embodiment 6 | 30 | | 94 | ○ |
| Comparative example 1 | 40 | | 161 | X |
| Comparative example 2 | 50 | | 285 | X |
| Comparative example 3 | 0.5 | No treatment | 470 | X |
| Comparative example 4 | 2.0 | | 473 | X |
| Comparative example 5 | 5.0 | | 482 | X |
| Comparative example 6 | 10 | | 485 | X |
| Comparative example 7 | 20 | | 484 | X |
| Comparative example 8 | 30 | | 479 | X |
| Comparative example 9 | 40 | | 466 | X |
| Comparative example 10 | 50 | | 489 | X |
| Comparative example 11 | 0.5 | Heat treatment only | 267 | X |
| Comparative example 12 | 2.0 | | 285 | X |
| Comparative example 13 | 5.0 | | 298 | X |
| Comparative example 14 | 10 | | 303 | X |
| Comparative example 15 | 20 | | 310 | X |
| Comparative example 16 | 30 | | 357 | X |
| Comparative example 17 | 40 | | 430 | X |
| Comparative example 18 | 50 | | 444 | X |
| Comparative example 19 | 0.5 | Organic solvent immersion treatment only | 12 | ○ |
| Comparative example 20 | 2.0 | | 17 | ○ |
| Comparative example 21 | 5.0 | | 65 | ○ |
| Comparative example 22 | 10 | | 123 | X |
| Comparative example 23 | 20 | | 176 | X |
| Comparative example 24 | 30 | | 288 | X |
| Comparative example 25 | 40 | | 376 | X |
| Comparative example 26 | 50 | | 398 | X |

From the results in Table 1, in embodiments 1 to 6 in which heat treatment and immersion treatment in organic solvent were performed, since the content of low-molecular-weight siloxanes $D_3$-$D_{20}$ contained in the optical member is infinitesimal amount, it is possible to reduce risk of contact faults, or deterioration or contamination of the surfaces of other members due to adhesion to the electronic circuit incorporated with the optical member or surfaces of other members, mass change caused by volatilization of contained low-molecular-weight siloxane due to heating on the optical member is small, in which shape change rate is +/−1%. Comparative examples 19 to 21 also show the amount of low-molecular-weight siloxanes $D_3$-$D_{20}$ being infinitesimal amount, but an immersion treatment in organic solvent needs to be performed for a longer time than in embodiments 1 to 6, and in addition, the content is higher. According to the present invention, it is possible to remove low-molecular-weight siloxanes $D_3$-$D_{20}$ in a shorter time, to meet a market demand for further reduction of the content of low-molecular-weight siloxanes $D_3$-$D_{20}$, and to provide an optical member which is formed from a silicone resin or a silicone rubber in which precise optical design is required.

The invention claimed is:

1. A production method, comprising:
    producing an optical member that transmits or guides light, the optical member having
        a silicone resin or a silicone rubber having a total content of low-molecular-weight siloxanes $D_3$-$D_{20}$ of 100 ppm or less;
    wherein, the producing includes
        a removing step (A) that reduces the content of low-molecular-weight siloxane $D_3$-$D_{10}$; and
        a removing step (B) that reduces the content of low-molecular-weight siloxane $D_{11}$-$D_{20}$;
    the removing step (A) being a different process than the removing step (B) to increase the efficiency of removal of the low molecular-weight siloxane $D_3$-$D_{20}$ from the optical member.

2. The method of claim 1, wherein the producing includes reducing the total content of low-molecular-weight siloxanes $D_3$-$D_{20}$ of the optical member to 50 ppm or less.

3. The method of claim 1, wherein the producing includes reducing the total content of low-molecular-weight siloxanes $D_3$-$D_{20}$ of the optical member to 25 ppm or less.

4. The method of claim 1, wherein the method includes producing the optical member to have a transmittance of 80% or more in the entire range of visible light wavelength region and near infrared wavelength region of 380 nm to 1,000 nm.

5. The method of claim 1, wherein the method includes producing the optical member to have a representative thickness of 30 mm or less.

6. The method of claim 1, wherein the method includes producing the optical member to function as an in-vehicle optical member.

7. The method of claim 1, wherein the method includes producing the optical member to have a shape that aligns with another member for mounting.

8. The method of claim 1, wherein the method includes producing the optical member without a natural silica or a synthetic silica.

9. The method of claim 1, wherein the method includes producing the optical member includes integrally molding, or adhesively bonding, (i) the silicone resin or the silicone rubber with (ii) a material other than the silicone or with another molded product, after molding (i) and (ii) into one body.

10. The method of claim 1, wherein the producing includes reducing the total content of low-molecular-weight siloxanes $D_3$-$D_{20}$ of the optical member to 65 ppm or less.

11. The production method of claim 1, wherein the low-molecular-weight siloxane removing step (A) is a heat treatment of the optical member, and wherein the low-molecular-weight siloxane removing step (B) is an immersing of the optical member in an organic solvent to remove low-molecular-weight siloxane $D_3$-$D_{20}$ from the optical member.

\* \* \* \* \*